United States Patent
Jones

(10) Patent No.: US 11,206,950 B2
(45) Date of Patent: Dec. 28, 2021

(54) WATER BOTTLE WITH PRINTABLE LINER

(71) Applicant: Specialized Bicycle Components, Inc., Morgan Hill, CA (US)

(72) Inventor: Ryan Curt Jones, Hollister, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 266 days.

(21) Appl. No.: 16/045,428

(22) Filed: Jul. 25, 2018

(65) Prior Publication Data

US 2019/0029469 A1 Jan. 31, 2019

Related U.S. Application Data

(60) Provisional application No. 62/536,899, filed on Jul. 25, 2017.

(51) Int. Cl.
*A47J 41/00* (2006.01)
*A45F 3/16* (2006.01)
*A45F 3/20* (2006.01)

(52) U.S. Cl.
CPC ............. *A47J 41/0077* (2013.01); *A45F 3/16* (2013.01); *A45F 3/20* (2013.01); *A47J 41/0083* (2013.01)

(58) Field of Classification Search
CPC .............. A47J 41/0072; A47J 41/0077; B65D 81/3811; B65D 81/3823; B65D 81/3846; B65D 81/3874; B65D 81/3886
See application file for complete search history.

(56) References Cited

U.S. PATENT DOCUMENTS

| | | | |
|---|---|---|---|
| 3,094,448 A * | 6/1963 | Cornelius | A47J 41/0077 156/78 |
| 3,285,450 A * | 11/1966 | Piker | A47J 41/0077 215/12.2 |
| 4,871,597 A | 10/1989 | Hobson | |
| 5,316,193 A | 5/1994 | Heiberger | |
| 5,494,198 A | 2/1996 | Heiberger | |
| 5,901,882 A | 5/1999 | Siegel | |
| 6,073,796 A | 6/2000 | Mogil | |
| 6,164,469 A | 12/2000 | Sartore | |
| 8,252,224 B2 | 8/2012 | Blain | |

(Continued)

FOREIGN PATENT DOCUMENTS

| | | | |
|---|---|---|---|
| CN | 1440353 A | 9/2003 | |
| WO | WO-2006005002 A2 * | 1/2006 | A47J 41/0077 |

OTHER PUBLICATIONS

International Search Report and Written Opinion for Application No. PCT/US2018/043734 dated Oct. 15, 2018 (13 pages).

(Continued)

*Primary Examiner* — Allan D Stevens
(74) *Attorney, Agent, or Firm* — Michael Best & Friedrich LLP

(57) ABSTRACT

A liquid dispensing container has an outer shell including a wall having an inner surface and an outer surface. An inner core is coupled to the outer shell and has an outer surface and an inner surface that defines a reservoir configured to contain a fluid. The inner core and outer shell cooperatively define a longitudinal axis. A liner is positioned between the outer shell and the inner core. The liner comprises a stretchable material that is in stretched along the longitudinal axis.

18 Claims, 8 Drawing Sheets

(56) References Cited

U.S. PATENT DOCUMENTS

| | | | |
|---|---|---|---|
| 2001/0038014 A1 | 11/2001 | Donelson et al. | |
| 2009/0212059 A1 | 8/2009 | Chen | |
| 2010/0288758 A1 | 11/2010 | Blain | |
| 2011/0108516 A1 | 5/2011 | McFarland | |
| 2013/0287978 A1* | 10/2013 | Lee | F16L 59/026 |
| | | | 428/35.3 |
| 2015/0136797 A1 | 5/2015 | Li | |
| 2016/0084424 A1* | 3/2016 | Kuhn | F16L 59/065 |
| | | | 53/427 |
| 2017/0305640 A1* | 10/2017 | Thompson | B65D 23/0878 |
| 2019/0142085 A1* | 5/2019 | Wilson | A41D 27/10 |
| | | | 2/328 |

OTHER PUBLICATIONS

Extended European Search Report for Application No. 18838270.9 dated Mar. 4, 2021 (6 pages).
Office Action issued from the Chinese Patent Office for related Application No. 201880054168.7 dated May 28, 2021 (8 Pages including Statement of Relevance).
Office Action issued from the Chinese Patent Office for related Application No. 201880054168.7 dated May 28, 2021 (15 Pages including English Translation).
Office Action issued from the Taiwanese Patent Office for related Application No. 107125762 dated Sep. 22, 2021 (18 Pages including English Translation).

* cited by examiner

WATER BOTTLE WITH PRINTABLE LINER

RELATED APPLICATION(S)

This application is based on U.S. Provisional Application Ser. No. 62/536,899, filed Jul. 25, 2017, the disclosure of which is incorporated herein by reference in its entirety and to which priority is claimed.

BACKGROUND

The present invention relates generally to water bottles commonly used by cyclists for rehydration, and more specifically to insulated water bottles.

Water bottles are commonly used by athletes and others to hold and dispense liquids, such as water and sports drinks. Water bottles commonly include a body, a cap, and a valve that is movable relative to the cap between open and closed positions. Some water bottles include an outer wall, and inner wall, and a liner positioned between the outer and inner walls. The liner can include graphics (e.g., symbols, words, art, etc.) visible through the outer wall. However, conventional liners are typically made from a foil that has a crinkled profile such that any graphics that are printed on the liner have a distorted appearance. In addition, foil liners are typically loosely positioned between inner and outer shells such that squeezing of the outer shell merely compresses the air between the shells and does not immediately squeeze the inner shell to forcibly dispense liquid.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

According to an exemplary embodiment, a liquid dispensing container has an outer shell including a wall having an inner surface and an outer surface. An inner core is coupled to the outer shell and has an outer surface and an inner surface that defines a reservoir configured to contain a fluid. The inner core and outer shell cooperatively define a longitudinal axis. A liner is positioned between the outer shell and the inner core. The liner comprises a stretchable material that is stretched along the longitudinal axis.

According to another exemplary embodiment, a liquid dispensing container has an outer shell including a wall having an inner surface and an outer surface. An inner core is coupled to the outer shell and has an outer surface and an inner surface that defines a reservoir configured to contain a fluid. The inner core and outer shell cooperatively define a longitudinal axis. A liner is positioned between the outer shell and the inner core. The liner is compressed between the outer shell and the inner core.

Another embodiment is directed to a method of assembling a liquid dispensing container using an outer shell, an inner core, and an insulating liner. The liner is inserted into the outer shell. An upper end of the liner is sandwiched between the inner core and outer shell. The inner core is inserted into the liner in the longitudinal direction. The liner is longitudinally stretched. The outer shell is secured with the inner core.

Figure 1:
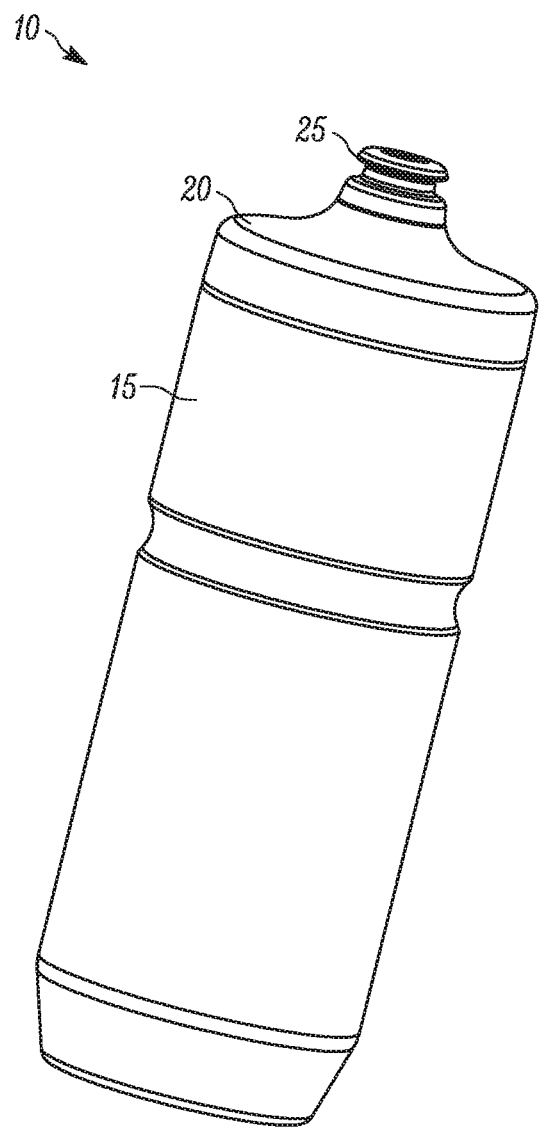
FIG. 1 illustrates a perspective view of an exemplary liquid dispensing container including a housing and a cap that is coupled to the housing.
Figure 2:
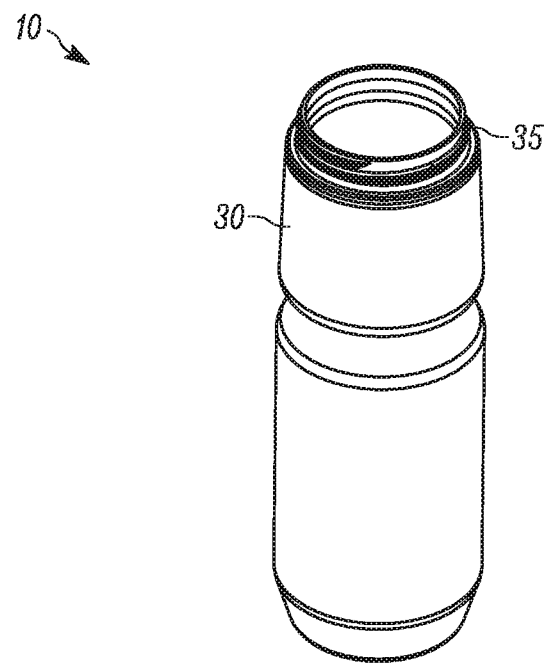
FIG. 2 illustrates a perspective view of the housing including an outer shell, an inner core, and a liner positioned between the outer shell and the inner core.

FIG. 1 illustrates an exemplary liquid-dispensing container 10 (e.g., water bottle) including a housing 15 and a cap 20 that is threaded onto the housing 15. The cap 20 shown in FIG. 1 includes a poppet 25 that has a valve that is movable relative to the remainder of the cap 20 between a closed position and an open position. It will be appreciated that the cap 20 can have different types of poppets and/or valves.

Figure 3:
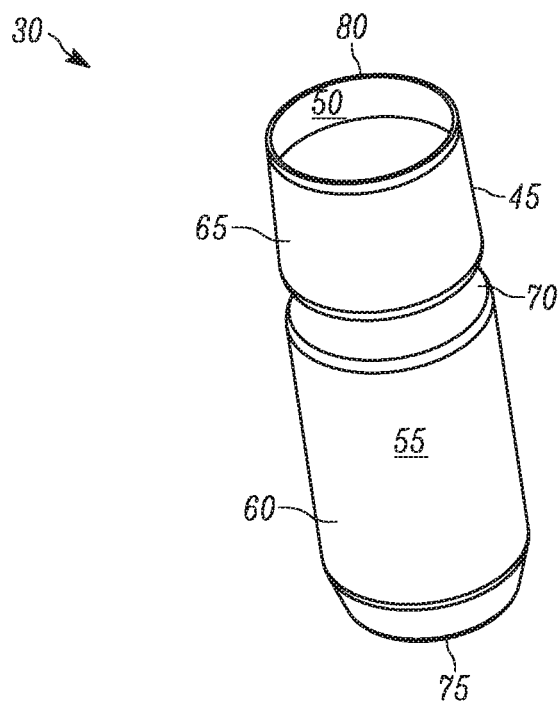
FIG. 3 is a perspective view of the outer shell of FIG. 1.

With reference to FIGS. 2-5, the illustrated housing 15 includes an outer shell 30 (FIG. 3), an inner core 35 (FIG. 4), and a liner 40 (FIG. 5) that is positioned between the outer shell 30 and the inner core 35. The outer shell 30 is formed from a flexible material (e.g., low-density polyethylene or "LDPE") so that a user can squeeze the outer shell 30 to dispense fluid, although the outer shell 30 can be rigid. As illustrated in FIG. 3, the outer shell 30 is translucent or clear so that the liner 40 is visible through the outer shell 30.

Figure 6A:
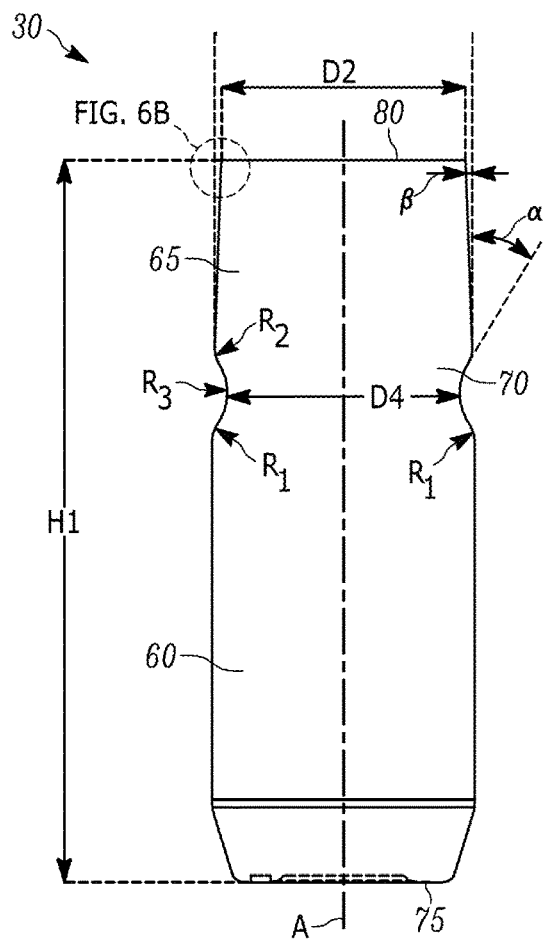
FIG. 6A is a front view of the outer shell of FIG. 2.

With reference to FIGS. 3 and 6A, the illustrated outer shell 30 is formed from a polymer material, for example a blow-molded plastic material (e.g., 0.5 millimeter (0.020 inch) thick) and includes an annular shell wall 45 that has an inner surface 50 and an outer surface 55. It will be appreciated that other materials can be used to form the outer shell 30. The shell wall 45 defines a shell base portion 60, a shell top portion 65, and a shell throat section 70 that is located between the shell base portion 60 and the shell top portion 65. The shell base portion 60 has a shell base end 75 and the shell top portion 65 has a shell top end 80 opposite the shell base end 75 such that the outer shell 30 has a height H1 (FIG. 6A) between the respective ends 75, 80. The shell throat section 70 curves inward from the shell base portion 60 and the shell top portion 65, and has a narrower width or diameter than the shell base portion 60 or the shell top portion 65. As shown, the shell throat section 70 is spaced approximately 50%-75% of the height H1 from the shell base end 75. The shell throat section 70 is located so that the container 10 can be retained by a bottle cage (not shown) that is coupled to a bicycle, or so that a user can easily grasp the container 10. It will be appreciated that the shell throat section 70 can be located closer to the shell base end 75 or closer to the shell top end 80 without deviating from the scope of the invention.

Figure 6B:
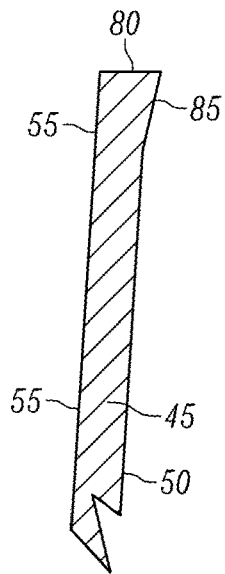
FIG. 6B is an enlarged section view of an upper portion of the outer shell of FIG. 6A.
Figure 8A:
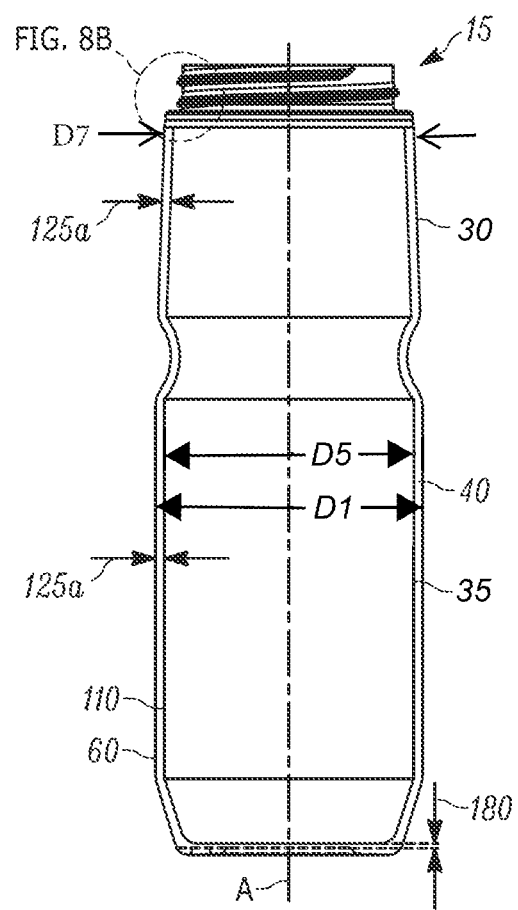
FIG. 8A is a section view of the housing of FIG. 1 illustrating the outer shell, the inner core, and the liner after assembly.

FIG. 6A shows that the shell base portion 60 decreases in width or diameter (e.g., tapers) adjacent the shell base end 75 such that the shell base portion 60 has a chamfered appearance at the bottom. Referring to FIG. 6B, the shell wall 45 has a substantially uniform thickness and an enlarged section or protrusion 85 (e.g., approximately 3 millimeters (0.12 inch) in thickness) that extends inward from the shell wall 45 at the shell top end 80. It will be appreciated that the rim of the shell wall 45 can have a single, continuous protrusion 85, or a plurality of protrusions 85 located around the circumference of the shell rim and spaced from each other. Referring to FIGS. 6A and 8A, the shell wall 45 has a substantially constant inner width or diameter D1 (e.g., approximately 70 millimeters (2.76 inches)) between the shell base portion 60 and the shell throat section 70. As illustrated in FIG. 6A, the shell wall 45 tapers inward slightly from the shell throat section 70 toward the shell top end 80 (e.g., from approximately 70 millimeters (2.76 inches) inner width adjacent the shell throat section 70 to approximately 67.5 millimeters (2.66 inches) inner width (D2) at the shell top end 80, corresponding to an angle of approximately 2 degrees relative to vertical as shown by the angle β). In other embodiments, this upper portion of the shell wall 45 can have a different taper angle or a constant inner width or diameter.

The shell throat section 70 has a first curvature with a first radius R1 (e.g., approximately 7 millimeters (0.275 inch)) at the juncture or transition between the shell base portion 60 and the shell throat section 70. The shell throat section 70 has a second curvature with a second radius R2 (e.g., approximately 10.5 millimeters (0.42 inch)) at the juncture or transition between the shell top portion 65 and the shell throat section 70. The shell throat section 70 has a third curvature with a third radius R3 (e.g., approximately 16 millimeters (0.63 inch)) at a central portion of the shell throat section 70. In general, each radius R1 and R2 is selected so that the outer shell 30 does not collapse in the area of the transition between the throat section 70 and the shell base and top portions 60, 65 when the container 10 is squeezed. Instead, the selected radii R1, R2 provide sufficient rigidity or stiffness to the outer shell 30 in the throat area so that the surface of the outer shell 30 uniformly deforms under pressure from squeezing. The third radius R3 defines an area where a user can squeeze the housing 15 to dispense fluid, and provides a comfortable grip for the user. The shell wall 45 transitions outward at an angle α (e.g., approximately 30 degrees between the third radius R3 and the second radius R2 (relative to vertical)). It will be appreciated that other combinations of radii R1-R3 and other values for angle α are contemplated herein. In other embodiments, radii R1-R3 can be omitted.

Figure 4:
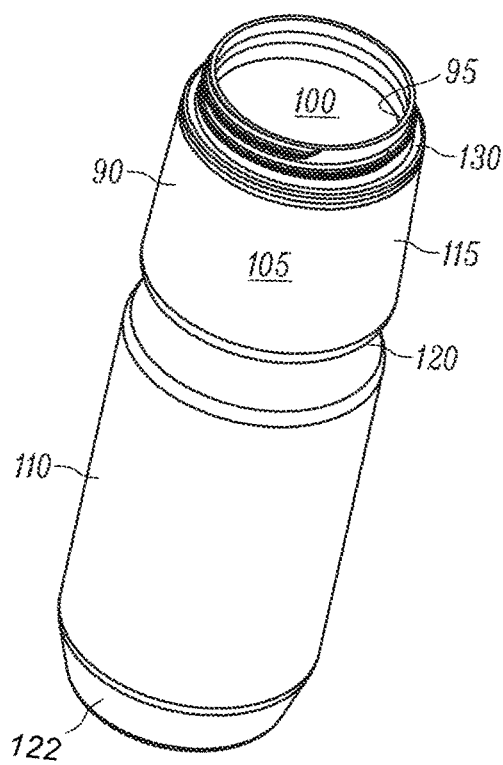
FIG. 4 is a perspective view of the inner core of FIG. 1.
Figure 7A:
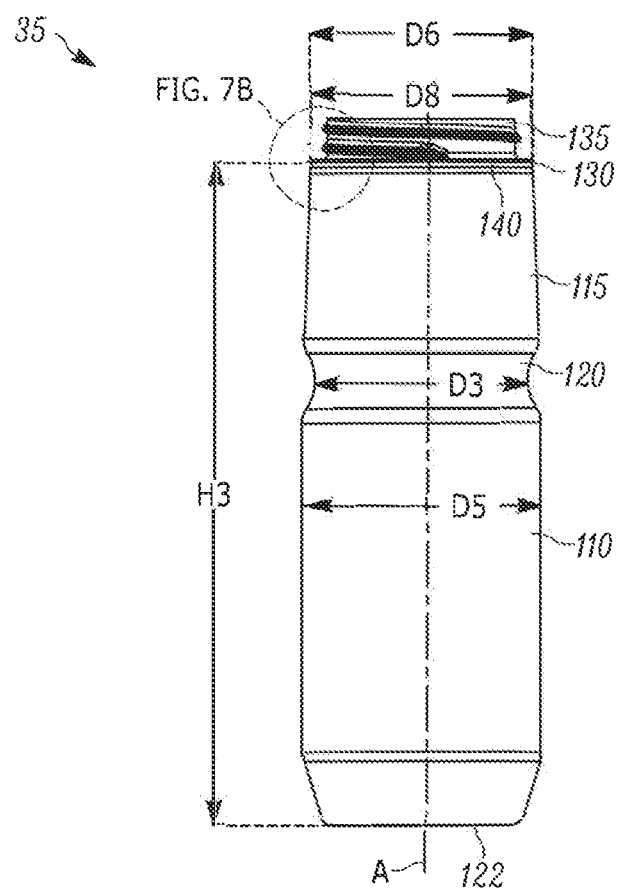
FIG. 7A is a front view of the inner core of FIG. 3.

With reference to FIGS. 4 and 7A, the illustrated inner core 35 includes an annular core wall 90 that defines a reservoir 95 to hold a fluid (e.g., water, hydration drinks, etc.) and that has an inner surface 100 and an outer surface 105. The inner surface 100 can include a polymeric coating that can prevent stains and liquid or material migration. The core wall 90 defines a core base portion 110, a core top portion 115, and a core throat section 120 that is located between the core base portion 110 and the core top portion 115. The core throat section 120 curves inward from the core base portion 110 and the core top portion 115, and has a narrower outer width or diameter (e.g., approximately 55-56 millimeters (2.16-2.20 inches)) than the core base portion 110 or the core top portion 115. As shown in FIGS. 7A and 8A, the core throat section 120 is located a distance from a core base end 122 so that the core throat section 120 aligns with the shell throat section 70 when the container 10 is assembled. With continued reference to FIGS. 6A, 7A, and 8A, the outer diameter D3 of the core throat section 120 is smaller than an inner diameter D4 of the shell throat section 70 such that a gap 125a (e.g., approximately 2.15 millimeters (0.085 inch)) exists between the throat sections 70, 120. Other embodiments can include different values for outer diameter D3, inner diameter D4, and gap 125a. For example, gap 125a can be greater or smaller.

FIG. 7A shows that the core base portion 110 decreases in width or diameter (e.g., curves) adjacent the core base end 122 such that the core base portion 110 has a rounded appearance at the bottom. While the illustrated outer shell 30 tapers near the shell base end 75 and the inner core 35 curves near the core base end 122, it will be appreciated that any combination of taper or curvature can be provided on the outer shell 30 and the inner core 35. Moreover, either or both of the outer shell 30 and the inner core 35 can be provided without a taper or curvature at the bottom.

With reference to FIG. 8A, the illustrated core base portion 110 has a width or diameter D5 (e.g., approximately 71 millimeters (2.80 inches)) such that the core wall 90 is defined by a cylindrical shape. The core base portion 110 is separated from the shell base portion 60 by the gap 125a. Likewise, the core top portion 115 tapers along an angle (e.g., approximately 2 degrees) relative to vertical such that the core top portion 115 is separated from the shell top portion by the gap 125a. It will be appreciated that the core top portion 115 can have the same, a smaller, or a larger diameter compared to the core bottom portion 110, and that the core top portion 115 may taper at a different angle or not taper at all relative to vertical. As illustrated in FIG. 8A, as well as FIGS. 6A and 7A, the liquid-dispensing container 10 extends along a longitudinal axis A.

Figure 7B:
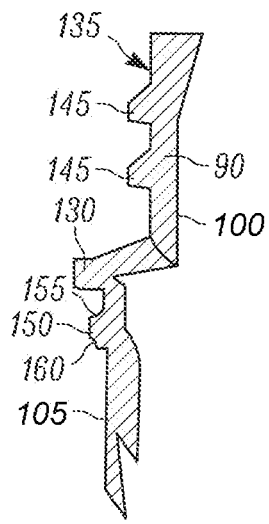
FIG. 7B is an enlarged section view of an upper portion of the inner core of FIG. 7A.
Figure 9:
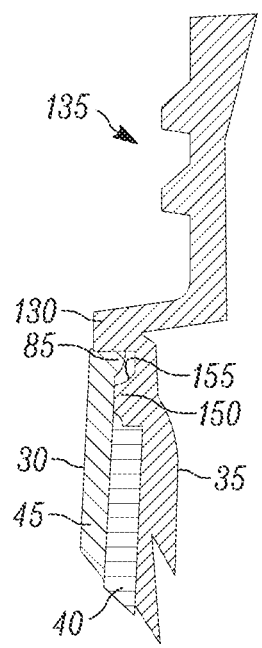
FIG. 9 is an enlarged section view of an upper portion of the housing of FIG. 1 illustrating the relationship between outer shell, the inner core, and the liner after assembly.

As shown in FIGS. 7A, 7B, and 9, the core top portion 115 includes an annular ridge 130, a cap retainer 135 disposed above the annular ridge 130, and a shell retainer 140 disposed below the annular ridge 130. The cap retainer 135 includes threads 145 that can be engaged by threads (not shown) on the cap 20. The annular ridge 130 has an outer width or diameter D6 (e.g., approximately 70 millimeters (2.76 inches)) that substantially matches an outer width or diameter of the cap 20. The width or diameter D6 of the annular ridge 130 also substantially matches an outer width or diameter D7 of the outer shell 30 at the shell top end 80 (e.g., the annular ridge 130 and the outer shell 30 join to define a lap joint). The shell retainer 140 has a retention cleat 150 with an outer width or diameter D8 that is smaller than the outer width or diameter D6 of the annular ridge 130 (e.g., approximately 68 millimeters (2.68 inches)).

Figure 5:
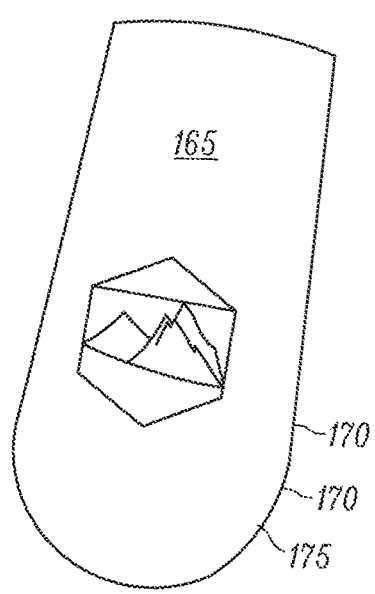
FIG. 5 is a perspective view of the liner of FIG. 1.
Figure 8B:
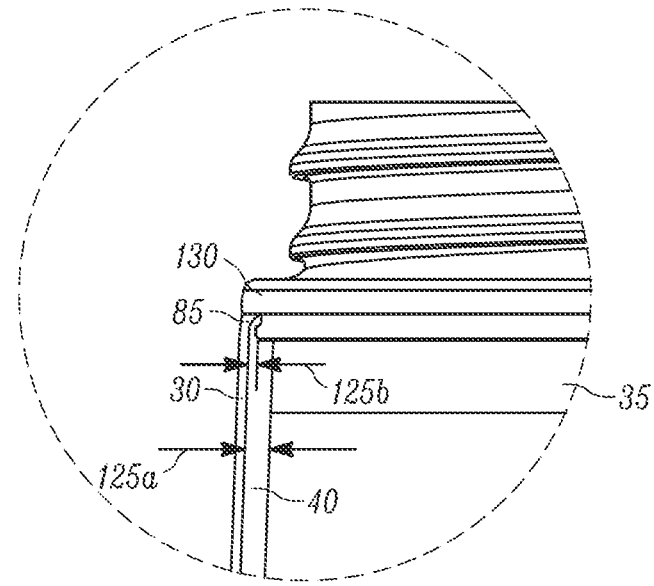
FIG. 8B is an enlarged section view of a portion of the housing of FIG. 8A illustrating the outer shell, the inner core, and the liner after assembly.
Figure 10:
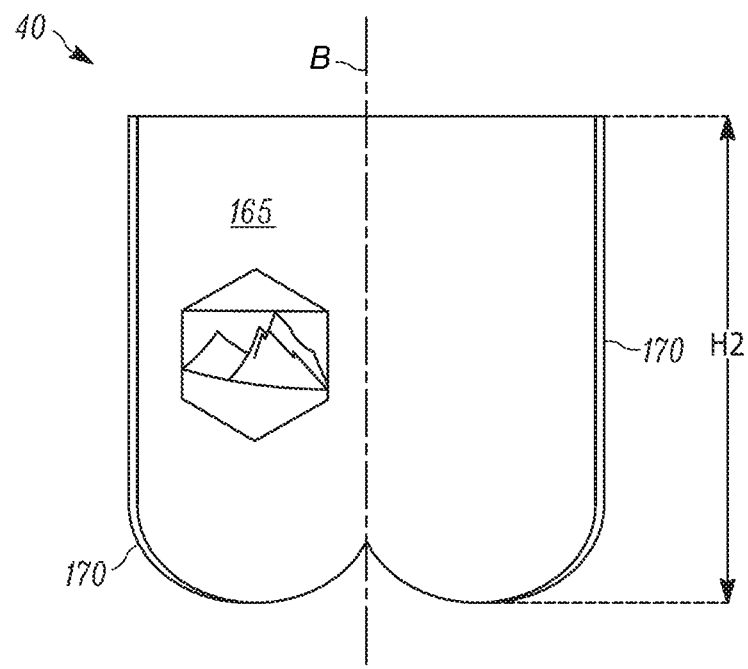
FIG. 10 is a plan view of an exemplary liner prior to assembly of the liner.

The annular ridge 130 and the retention cleat 150 cooperate to define a channel 155 into which the enlarged protrusion 85 on the shell wall 45 can be received in a secure (e.g., snap-fit) arrangement. With reference to FIGS. 8B and 9, the retention cleat 150 has an outward-facing surface that is spaced from the inner surface 50 of the shell wall 45 by a gap 125b (e.g., approximately 1.9 millimeters (0.075 inch)). The gap 125b is smaller toward the respective top ends of the outer shell 30 and the inner core 35 so that the top of the liner 40 can be retained at the top of the shell 30 during assembly/insertion of the inner core 35 into the liner 40. The retention cleat 150 also has a chamfered edge or surface 160 (e.g., oriented at an approximately 45° angle relative to horizontal as defined by the core base end 122 or the underside/lower surface of the annular ridge 130) on a lower side of the retention cleat 150 (as viewed in FIG. 7B) so that the shell top end 80 can slide over the retention cleat 150 into the channel 155 as described in detail below. In other embodiments, the chamfered edge or surface 160 can be oriented at any other suitable angle configured to permit the shell top end 80 to slide over the retention cleat 150 into the channel 155 as described in detail below Referring to FIGS. 2, 5, 8, and 10, the liner 40 is sandwiched or encapsulated between the outer shell 30 and the inner core 35, and includes a printable surface 165. The liner 40 defines a printable, insulative lining between the outer shell 30 and the inner core 35. As shown in FIGS. 5 and 10, the liner 40 can be formed from a single piece of material that has symmetrical outer edges 170 (symmetrical along a longitudinal axis B). The outer edges 170 are configured to be secured to each other to form a sock-like shape (e.g., generally cylindrical) by any suitable process (e.g., stitching, sewing, welding, etc.) such that the liner 40 has a single continuous seam 175 defined by the mated edge 170. Of course, the liner 40 can instead be formed from separate pieces of material such that multiple seams exist or can be formed as a seamless tube.

Figure 11:
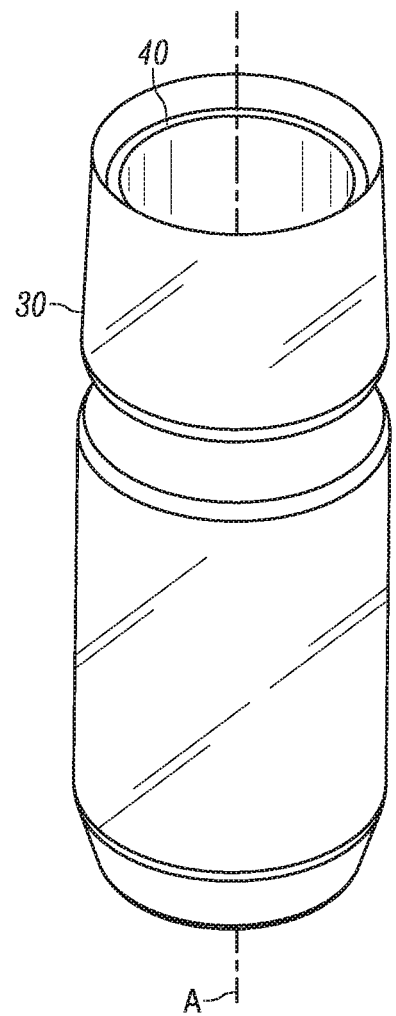
FIG. 11 is a perspective view of the housing including the outer shell and the liner in an assembled state.

According to various exemplary embodiments, the liner 40 has a static, unstressed (i.e. unstretched) length or height H2 (e.g., approximately 225.5 millimeters (8.88 inches)). The height H2 can be greater than the outer shell 35 having the height H1 (e.g., approximately 203.2 millimeters (8.00 inches)) and the inner core 35 having a height H3 (e.g., approximately 197 millimeters (7.76 inches)) from the bottom to the underside of the annular ridge 130. The outer diameter of the illustrated liner 40 is approximately 66 millimeters (2.60 inches), and the inner diameter (e.g., inside seam tolerance) is approximately 63.5 millimeters (2.50 inches). The liner height H2 is shown prior to the liner 40 being sewn together and formed into a cylindrical shape to be placed in the outer shell 35. As best shown in FIG. 11, the height of the liner 40 when placed in the outer shell 35 is less than the height H1 of the outer shell 35.

The illustrated liner 40 includes three layers—a middle or central layer that has insulative properties and that is sandwiched by two layers that are conducive to printing or receiving printed graphics. For example, the outer layers can include the same or different materials (e.g., polyester), and the middle layer can include a foam (e.g., closed-cell foam). In the illustrated embodiment, the liner 40 has a thickness of approximately 3 millimeters (0.12 inch), although other thicknesses are possible and considered herein, depending on the relative diameters between the outer shell 30 and the inner core 35. The material forming the liner 40 is generally breathable (i.e. allows air to pass through), and the material provides at least a two-way stretch (e.g. longitudinally or vertically). As illustrated, the liner 40 has four-way stretchability (i.e. longitudinally or vertically, and laterally or circumferentially). The liner 40 can be printed with graphics (e.g., graphics 175 in FIGS. 2 and 5) using a sublimation process. With this process, graphics are first digitally printed onto transfer paper, then transferred onto the liner 40 via sublimation. It will be appreciated that other printing processes can be used to print graphics or other information on the liner 40.

The liner 40 can be printed before or after the liner 40 is formed into the sock-like shape that is illustrated in FIG. 5. With reference to FIG. 11, the finished liner 40 (after printing and sewing, for example) is inserted into the outer shell 30. Due to the relatively loose relationship between the outer shell 30 and the liner 40, and the breathability of the liner 40, air easily escapes from the assembled components during installation. For example, one or more gaps may exist between the outer shell 30 and the liner 40 that assist with allowing air to escape.

With the liner 40 positioned inside the outer shell 30, the inner core 35 is inserted into the inner void of the liner 40 until the enlarged protrusion 85 is secured within the channel 155 and engaged with the lower side of the annular ridge 130. When pressing the inner core 35 into the outer shell-liner assembly, the outer shell 30 can expand slightly (e.g., one or a few millimeters) due to insertion of the inner core 35. This expansion also helps air in the shell-liner assembly to escape during insertion of the inner core 35. The breathability of the material making up the liner 40 also contributes to escape of air during assembly. As a result, the inner surface 50 of the outer shell 30 is smooth (i.e. devoid of internal standoffs that are provided in conventional containers) because air can vent from the container 10 during assembly via the breathable liner 40 and how the inner core 35 is inserted into the shell-liner assembly.

As the inner core 35 is inserted into the liner 40, the top of the liner 40 remains at the top of the shell 30 due to the tight fit between the inner core 35 and the shell-liner assembly generated by the smaller gap 125b between the cleat 150 and the inner surface 50. The liner 40 stretches longitudinally (i.e. along the length of the container 10) as the inner core 35 continues to be inserted due to the relatively tight tolerances between the inner diameter of the outer shell 30, the outer diameter of the inner core 35, and the thickness of the liner 40.

As the top end 80 moves toward the annular ridge 130 during assembly (due to relative movement between the outer shell 30 and the inner core 35), the top end 80 and the protrusion 85 bias outward when encountering the chamfered edge 160 on the retention cleat 150. Further relative movement snaps the protrusion 85 into the channel 155, which tightly presses the top end 80 into engagement with the annular ridge 130 and compresses the liner 40 within the gaps 125a, 125b. With the inner core 35 so positioned, the joint or seam between the annular ridge 130 and the shell top end 80 is joined together (e.g., via a laser welding process or another suitable joining process). The illustrated joint between the outer shell 30 and the inner core 35 allows the inner surface 50 of the outer shell 30 to nest into the channel 155 on the inner core 35. The chamfered edge 160 on the inner core 35 allows the shell top end 80 to slide over the retention cleat 150 into engagement with the channel 155 and the annular ridge 130. The welded joint provides a hermetic seal that encapsulates the liner 40.

The stretchability of the liner 40 allows the liner 40 to conform to the silhouettes of the shell 30 and the inner core 35 without bunching up and disrupting the graphics, which contributes to a smooth outer appearance for the liner 40 after assembly and stands in stark contrast to the crinkled or wrinkled appearance in other containers. More specifically, liner 40 is compressed between the outer shell 30 and the inner core 35 from the top of the outer shell 30, through the throat regions 70, 120, and to the bottom of the inner core 35 such that no diametrical space exists between the outer shell 30, the inner core 35, and the liner 40 after assembly. As a result, the liner 40 is smooth throughout the throat area as well as in the top and bottom areas of the container. In some embodiments, the liner 40 may bunch up along the bottom of the container 10 (in the vertical space 180 between the outer shell 30 and the inner core 35 as shown in FIG.

8A). Any bunching of the liner 40 in this area can be concealed with a less translucent (i.e. more opaque) bottom end on the outer shell 30.

The gap 125a, 125b provides structure or stability to the container 10 so that when a user squeezes the container 10, the liner 40 generally stays in place vertically (i.e. the liner 40 does not crinkle or withdraw from the top of the shell 30). In addition, the gap 125a, 125b is designed or selected so that the liner is completely compressed in the lateral direction. This lateral compression also contributes to an 'immediate reaction' experienced by a user during use. More specifically, when container 10 is squeezed, outer shell 30, the liner 40, and the inner core 35 react immediately to dispense fluid. That is, a user may desire, and the container 10 advantageously can provide, an outer shell 30, a liner 40, and an inner core 35 that move together upon squeezing of the container 10. If the air gap between the outer shell 30 and the inner core 35 is too large (even if the liner 40 is still in contact with at least some of the outer shell 30 and the inner core 35), the user will experience a delayed response to squeezing of the container 10.

The diameters of the throat sections 70, 120, and more importantly, the spacing between the throat sections 70, 120 helps the liner 40 lay down and conform to the silhouette of the outer shell 30, and the inner core 35. This eliminates bunching of the liner 40 in an area that is typically visible to a user, as well as disfiguration or distortion of graphics on the liner 40. The stretchability of the liner 40 also contributes to maintaining a smooth outer surface of the liner 40 during use (e.g., when the container 10 is squeezed). In this manner, the liner 40 advantageously can offer a smooth, 360°, top-to-bottom, surface area that can be printed with custom graphics while remaining protected from abrasion.

Various features and advantages of the invention are set forth in the following claims.

What is claimed is:

1. A liquid dispensing container comprising:
   an outer shell including a wall having an inner surface and an outer surface;
   an inner core coupled to the outer shell and having an outer surface and an inner surface that defines a reservoir configured to contain a fluid, the inner core and outer shell cooperatively defining a longitudinal axis; and
   a liner positioned between the outer shell and the inner core, wherein the liner comprises a stretchable material that is stretched along the longitudinal axis;
   wherein the liner includes three layers, the three layers including a closed-cell foam layer sandwiched by two layers of air-permeable polyester.

2. The liquid dispensing container of claim 1, wherein the liner is compressed between the outer shell and the inner core.

3. The liquid dispensing container of claim 1, wherein the liner conforms to the shape of the outer surface of the inner core.

4. The liquid dispensing container of claim 1, wherein the liner conforms to the shape of the inner surface of the outer shell.

5. The liquid dispensing container of claim 1, wherein the inner core includes an annular ridge and the outer shell has a top end that is flush with the annular ridge.

6. The liquid dispensing container of claim 5, wherein a joint between the top end of the outer shell and the annular ridge is welded to seal the liner between the outer shell and the inner core.

7. The liquid dispensing container of claim 5, wherein the inner core includes a retention cleat disposed below the annular ridge, wherein the annular ridge and the retention cleat cooperate to define a channel, and wherein the top end of the outer shell is snap-fit into the channel.

8. The liquid dispensing container of claim 1, wherein the inner core includes a threaded portion configured to be engaged by a cap to enclose the reservoir.

9. The liquid dispensing container of claim 1, wherein the outer shell includes a first throat section and the inner core includes a second throat section conforming to the profile of the first throat section, and wherein the second throat section is spaced from the first throat section by a gap, and wherein the liner is compressed within the gap.

10. A liquid dispensing container comprising:
    an outer shell including a wall having an inner surface and an outer surface;
    an inner core coupled to the outer shell and having an outer surface and an inner surface that defines a reservoir configured to contain a fluid, the inner core and outer shell cooperatively defining a longitudinal axis; and
    a liner positioned between the outer shell and the inner core, wherein the liner is compressed between the outer shell and the inner core;
    wherein the liner comprises three layers, the three layers including a closed-cell foam layer sandwiched by two layers of air-permeable polyester.

11. The liquid dispensing container of claim 10, wherein the liner conforms to the shape of the outer surface of the inner core.

12. The liquid dispensing container of claim 10, wherein the liner conforms to the shape of the inner surface of the outer shell.

13. The liquid dispensing container of claim 10, wherein the outer shell includes a first throat section and the inner core includes a second throat section conforming to the profile of the first throat section, and wherein the second throat section is spaced from the first throat section by a gap, and wherein the liner is compressed within the gap.

14. A method of assembling the liquid dispensing container of claim 1, the method comprising:
    inserting the liner into the outer shell;
    sandwiching an upper end of the liner between the inner core and outer shell;
    inserting the inner core into the liner along the longitudinal axis;
    longitudinally stretching the liner; and
    securing the outer shell to the inner core.

15. The method of claim 14, further comprising radially compressing the liner between the inner core and outer shell.

16. The method of claim 14, wherein the method further comprises permitting air to escape from within the outer shell through the two layers of air-permeable polyester.

17. The method of claim 14, wherein inserting the liner into the outer shell occurs before inserting the inner core into the liner.

18. The method of claim 14, wherein securing includes welding an upper edge of the outer shell to a portion of the inner core.

\* \* \* \* \*